(12) United States Patent
Erpelding et al.

(10) Patent No.: US 10,415,869 B2
(45) Date of Patent: Sep. 17, 2019

(54) SYSTEMS AND METHODS FOR REDUCING ENERGY CONSUMPTION OF A CHILLED WATER DISTRIBUTION SYSTEM

(71) Applicant: OPTIMUM ENERGY LLC, Seattle, WA (US)

(72) Inventors: Ben Erpelding, San Diego, CA (US); Ian Dempster, Seattle, WA (US)

(73) Assignee: OPTIMUM ENERGY LLC, Seattle, WA (US)

( * ) Notice: Subject to any disclaimer, the term of this patent is extended or adjusted under 35 U.S.C. 154(b) by 0 days.

(21) Appl. No.: 15/682,320

(22) Filed: Aug. 21, 2017

(65) Prior Publication Data

US 2017/0343267 A1 Nov. 30, 2017

Related U.S. Application Data

(63) Continuation-in-part of application No. 13/299,182, filed on Nov. 17, 2011.

(51) Int. Cl.
*F25D 17/02* (2006.01)
*F25B 25/00* (2006.01)
(Continued)

(52) U.S. Cl.
CPC ............ *F25D 17/02* (2013.01); *F25B 25/005* (2013.01); *F25B 49/02* (2013.01); *F24F 11/85* (2018.01);
(Continued)

(58) Field of Classification Search
CPC ........ F25D 17/02; F25B 49/02; F25B 25/005; F25B 2600/13; F24F 11/85; Y02B 30/745
(Continued)

(56) References Cited

U.S. PATENT DOCUMENTS 2,126,230 A 8/1938 Troxel
2,189,008 A 2/1940 Kurth
(Continued)

FOREIGN PATENT DOCUMENTS

JP 62330848 7/1989
JP 2112716 1/1992

OTHER PUBLICATIONS

Non-Final Office Action, U.S. Appl. No. 13/299,182, dated Oct. 8, 2013, pp. 13.
(Continued)

*Primary Examiner* — Ana M Vazquez
(74) *Attorney, Agent, or Firm* — P.G. Scott Born; Foster Pepper PLLC (57) ABSTRACT

A chilled water distribution system includes a chilled water loop in fluid communication with a plurality of buildings and also in fluid communication with a plurality of chiller stations. A monitoring and control system communicates with one of the chiller stations, hereinafter referred to as a "controlled" chiller station because it is configured with one or more variable frequency drives that are controlled by the monitoring and control system to modulate the speed of at least one chiller station component such as, but not limited to, a pump or a fan. By way of this modulation process, a differential pressure of the chilled water loop may be maintained at a desired level so as to optimize chiller station output while minimizing chiller station energy consumption.

12 Claims, 5 Drawing Sheets

(51) Int. Cl.
*F25B 49/02* (2006.01)
*F24F 11/85* (2018.01)

(52) U.S. Cl.
CPC ....... *F25B 2400/06* (2013.01); *F25B 2600/13* (2013.01); *Y02B 30/745* (2013.01)

(58) Field of Classification Search
USPC ........................................................ 62/259.1
See application file for complete search history.

(56) References Cited

U.S. PATENT DOCUMENTS

| | | | |
|---|---|---|---|
| 2,217,944 A | 10/1940 | Collicutt | |
| 2,674,934 A | 4/1954 | Tatt | |
| 3,400,374 A | 9/1968 | Schumann | |
| 3,729,051 A * | 4/1973 | Mannion | G05D 7/0641 |
| | | | 165/246 |
| 4,406,397 A | 9/1983 | Kamata et al. | |
| 4,515,069 A | 5/1985 | Kline et al. | |
| 4,545,524 A | 10/1985 | Zelczer | |
| 4,646,964 A | 3/1987 | Parker et al. | |
| 4,718,021 A | 1/1988 | Timblin | |
| 5,070,704 A | 12/1991 | Conry | |
| 5,179,524 A | 1/1993 | Parker et al. | |
| 5,251,814 A | 10/1993 | Warashina et al. | |
| 5,251,815 A | 10/1993 | Foye | |
| 5,271,558 A | 12/1993 | Hampton | |
| 5,341,988 A | 8/1994 | Rein et al. | |
| 5,344,069 A | 9/1994 | Narikiyo | |
| 5,361,985 A | 11/1994 | Rein et al. | |
| 5,533,668 A | 7/1996 | Erikson | |
| 5,547,018 A | 8/1996 | Takahashi et al. | |
| 5,651,264 A * | 7/1997 | Lo | F24F 3/065 |
| | | | 62/230 |
| 6,185,946 B1 * | 2/2001 | Hartman | F04D 15/029 |
| | | | 62/175 |
| 9,252,018 B2 | 2/2016 | Mo et al. | |
| 2002/0139129 A1 | 10/2002 | Morse et al. | |
| 2004/0000155 A1 * | 1/2004 | Cline | F24F 3/065 |
| | | | 62/175 |
| 2005/0039904 A1 | 2/2005 | Aler et al. | |
| 2005/0103032 A1 * | 5/2005 | Pierson | F01K 23/10 |
| | | | 62/175 |
| 2006/0010839 A1 | 1/2006 | Koppen et al. | |
| 2006/0010893 A1 * | 1/2006 | Dominguez | F24F 3/06 |
| | | | 62/201 |
| 2008/0016890 A1 | 1/2008 | Dominguez | |
| 2009/0151388 A1 * | 6/2009 | Platt | F25B 29/003 |
| | | | 62/498 |
| 2009/0217686 A1 * | 9/2009 | Bittner | F25D 17/02 |
| | | | 62/157 |
| 2010/0023171 A1 * | 1/2010 | Bittner | F25B 49/02 |
| | | | 700/282 |

OTHER PUBLICATIONS

Final Office Action, U.S. Appl. No. 13/299,182, dated Jun. 18, 2014, pp. 15.
Non-Final Office Action, U.S. Appl. No. 13/299,182, dated Dec. 2, 2014, pp. 11.
Final Office Action, U.S. Appl. No. 13/299,182, dated Mar. 22, 2016, pp. 11.
Non-Final Office Action, U.S. Appl. No. 13/299,182, dated Sep. 21, 2016, pp. 22.
Final Office Action, U.S. Appl. No. 13/299,182, dated Apr. 20, pp. 20.
Non-Final Office Action, U.S. Appl. No. 13/299,182, dated Oct. 2, 2017, pp. 19.
International Search Report and Written Opinion for PCT/US2018/047225 dated Sep. 25, 2018, 11 pages.

* cited by examiner

SYSTEMS AND METHODS FOR REDUCING ENERGY CONSUMPTION OF A CHILLED WATER DISTRIBUTION SYSTEM

CROSS REFERENCE TO RELATED APPLICATIONS

This application is a continuation-in-part of U.S. patent application Ser. No. 13/299,182 filed Nov. 17, 2011, the entirety of which is hereby incorporated by reference as if fully set forth herein.

FIELD OF THE INVENTION

The present invention generally relates to systems and methods for reducing energy consumption of a chilled water distribution system by monitoring and controlling a variable speed drive within a base or controlled chiller station.

BACKGROUND OF THE INVENTION

A conventional chilled water system typically includes a cooling loop having a return and a supply line both in fluid communication with at least two chilling stations and with at least two buildings. In such conventional systems, the water supply pressures produced at the chilling stations are relatively high, which in turn may cause any number of undesired consequences. By way of example, the high pressures may reduce an operational life of the system even though a standard maintenance schedule is followed. Alternatively or in addition to, the high pressures may require more frequent maintenance, which in turn leads to higher costs. Further, the high pressures may necessitate the installation of pressure reducing valves, but while such valves may drop the incoming chilled water pressures their installation increases capital costs and system control complexity. Moreover, the pressure reducing valves may not adequately close off against the high pressures and over-cooling can become a problem.

BRIEF SUMMARY OF THE INVENTION

A chilled water distribution system includes a chilled water loop in fluid communication with a plurality of buildings and also in fluid communication with a plurality of chiller stations. A monitoring and control system communicates with one of the chiller stations, hereinafter referred to as a "controlled" chiller station because it is configured with one or more variable frequency drives that are controlled by the monitoring and control system to modulate the speed of at least one chiller station component such as, but not limited to, a pump or a fan. By way of this modulation process, a differential pressure of the chilled water loop may be maintained in a "sweet spot" so as to optimize chiller station output while minimizing chiller station energy consumption.

In one aspect of the present invention, a distributed process chilled water system includes a supply line having a supply line pressure sensor; a return line having a return line pressure sensor, the supply line pressure sensor and the return line pressure sensor cooperating to provide a differential pressure between the supply line and the return line; a plurality of buildings, each building having a building automation system controller, each building in fluid communication with the return and supply lines, the controllers communicatively networked together; a plurality of chiller stations comprising at least one base chiller station, each chiller station in fluid communication with the return and supply lines, the chiller stations communicatively networked together, at least one of the chiller stations in communication with at least one of the buildings; and an operating system operable to process machine-readable instructions, the operating system in communication with at least the base chiller station, the operating system configured to receive a signal indicative of the differential pressure, the operating system further configured, based on the differential pressure, to determine whether to modulate a pump speed of the base chiller station, bring another chiller online or take another chiller offline to maintain the differential pressure within a desired range.

In another aspect of the invention, a method for controlling a chilled water distribution system includes the steps of (1) determining a real-time differential pressure at a selected location within a chilled water loop of the distribution system; (2) monitoring a real-time pump speed of a base chiller station that includes a variable frequency drive coupled to a chilled water pump; (3) determining an energy load for a plurality of buildings served by the chilled water loop; (4) modulating the pump speed of the base chiller station to approximately stay within a desired range of pre-determined set point differential pressures of the chilled water loop; and (5) determining whether to change the capacity of distribution system by bringing a chiller of another chiller station either online or offline.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with chilled water distribution systems, the operating components used therein, chiller stations, pumps, sensors, a chilled water loop, various computing and/or processing systems, various system operational parameters, and methods of operating a chilled water distribution system that supplies one or more buildings have not necessarily been shown or described in detail to avoid unnecessarily obscuring descriptions of the embodiments of the invention.

In conventional chilled water distribution systems, the chilled water supply pressures produced at various chilling stations are relatively high, which in turn results in several consequences for the buildings served by the chilled water loop. For example, the high chilled water supply pressure for buildings close to the chilling station may necessitate the installation of pressure reducing valves to drop the incoming chilled water supply pressure, which increases capital costs and system complexity in terms of control, installation, and maintenance. The high chilled water supply pressure may mean that certain types of control valves cannot close off against the high pressure and combined with low cooling water temperatures this may create an over-cooling situation that requires heating compensation. Further, the high chilled water supply pressure may result in increased maintenance costs and maintenance frequency for all of the components in the system affected by the high pressure.

To address at least some of the aforementioned drawbacks with conventional systems, at least one aspect of the present invention involves a chilled water distribution system that supplies one or more buildings. For the present description, a building may generally include any structure that utilizes a chilled water supply line of the system and demands a non-zero load. Likewise, the term "load" may generally mean a flow requirement needed by the building's cooling unit, which may take the form of a roof-top cooling unit. Flow requirements are often referred to in terms of tonnage of water, for example a particular building may require 5,000 tons of water from the system to meet its present cooling and/or heating needs. And, the load required by a particular building often fluctuates throughout even a single day due to temperature changes, weather changes, time of day (e.g., primary work hours), etc.

The chilled water distribution system may be controlled by monitoring a chilled water loop pressure differential between the supply line and a return line to maintain a minimum pressure that still allows the chiller stations and the building's cooling units to function adequately. Reducing the chilled water loop differential pressure (i.e., the difference in pressure between the chilled water supply and chilled water return) may realize a number of advantages. By way of example, the chilled water distribution system of the present invention and methods of operating the same may advantageously reduce overall energy use (i.e., consumption) of the entire system and reduce energy use for at least two networked chilling stations, which in turn would reduce chilled water production costs and chilled water rates. The reduction in chilling station energy use may more than make up for any increased power consumption in one or more of the loads. Further, the maintenance costs associated with high pressure related problems may be reduced for the chilled water loop, the chiller stations and the loads.

Figure 1:
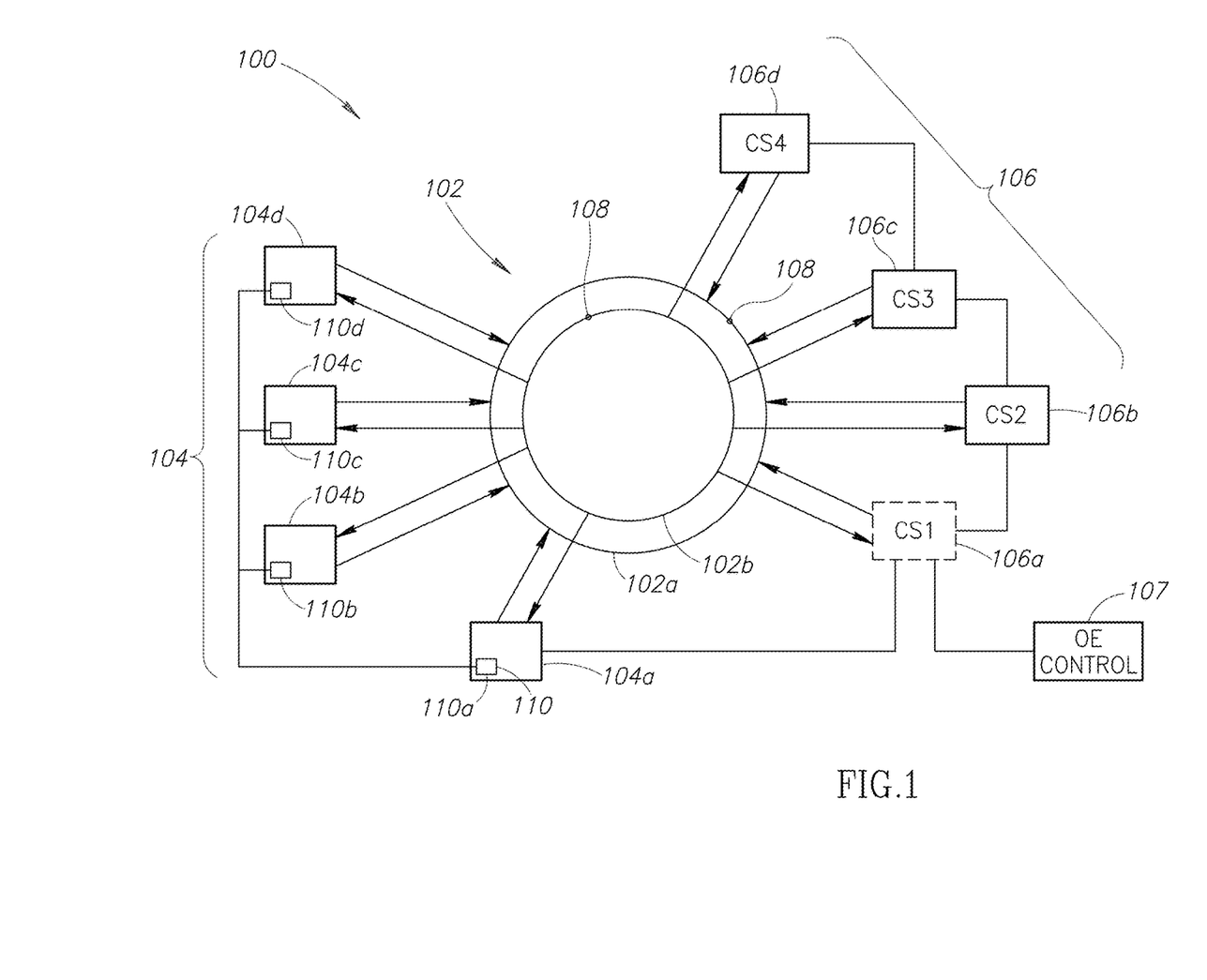
FIG. 1 is a schematic system diagram of a chilled water distribution system having an operating system in communication with at least one controlled chiller station to modulate a pump speed within the chiller station and/or to bring other chillers either online or offline according to an embodiment of the present invention.

FIG. 1 shows a schematic system diagram for a chilled water distribution system 100 having a chilled water loop or conduit 102 in fluid communication with a plurality of buildings 104 (individually illustrated as buildings 104a-104d) and also in fluid communication with a plurality of chiller stations 106 (individually illustrated as chiller stations 106a-106d). A monitoring and control system 107 communicates with one of the chiller stations 106, and in particular chiller station 106a, which is the chiller station 106a that is specifically configured with one or more variable frequency drives (not shown) for variably controlling a speed of at least one chiller station component such as, but not limited to, a pump or a fan.

The chilled water loop 102 includes a supply loop 102a and a return loop 102b. Pressure sensors 108 are in communication with the supply and return loops 102a, 102b, respectively, and a pressure difference between the sensor readings provides a chilled water differential pressure. Although two pressure sensors 108 are shown, the system 100 may include a plurality of sensors for taking pressure readings at various locations around the chilled water loop 102.

Each building 104 includes a building automation system (BAS) 110 (individually 110a-110d). The BASs 110 receive and exchange operating information with the respective building's heating, ventilation and cooling (HVAC) system. In one embodiment, the BASs may take the form of the BASs described in U.S. patent application Ser. Nos. 12/609, 452 and/or 12/874,607, both of which are incorporated herein by reference in their entireties. In the illustrated embodiment, the BASs may be networked together so they may receive and exchange information with each other, the chiller stations and the monitoring and control system 107. In another embodiment, the BASs 110 may operate independently from another while each communicates with the monitoring and control system 107.

In the illustrated embodiment, each chiller station 106 communicates with at least one other chiller station to provide a networked communication link. Chiller station 106a communicates directly with the monitoring and control system 107. As will be described in more detail below, the chiller station 106a operates as the primary chiller station in the group in response to the load requirements of the buildings and in conjunction with each chiller station's output and processing capacity.

In one embodiment, the monitoring and control system 107 takes the form of an operating system having relational control algorithms that automatically calculate the most efficient operation of the chilled water distribution system 100, to include the various components or subsystems within such as, but not limited to, chillers, pumps and cooling tower fans based on real-time, building cooling loads. The monitoring and control system 107 in operation as described herein may advantageously provide a holistic approach to maximizing energy efficiency while providing a stable operating performance not possible with conventional proportional-integral-derivative control.

Figure 2A:
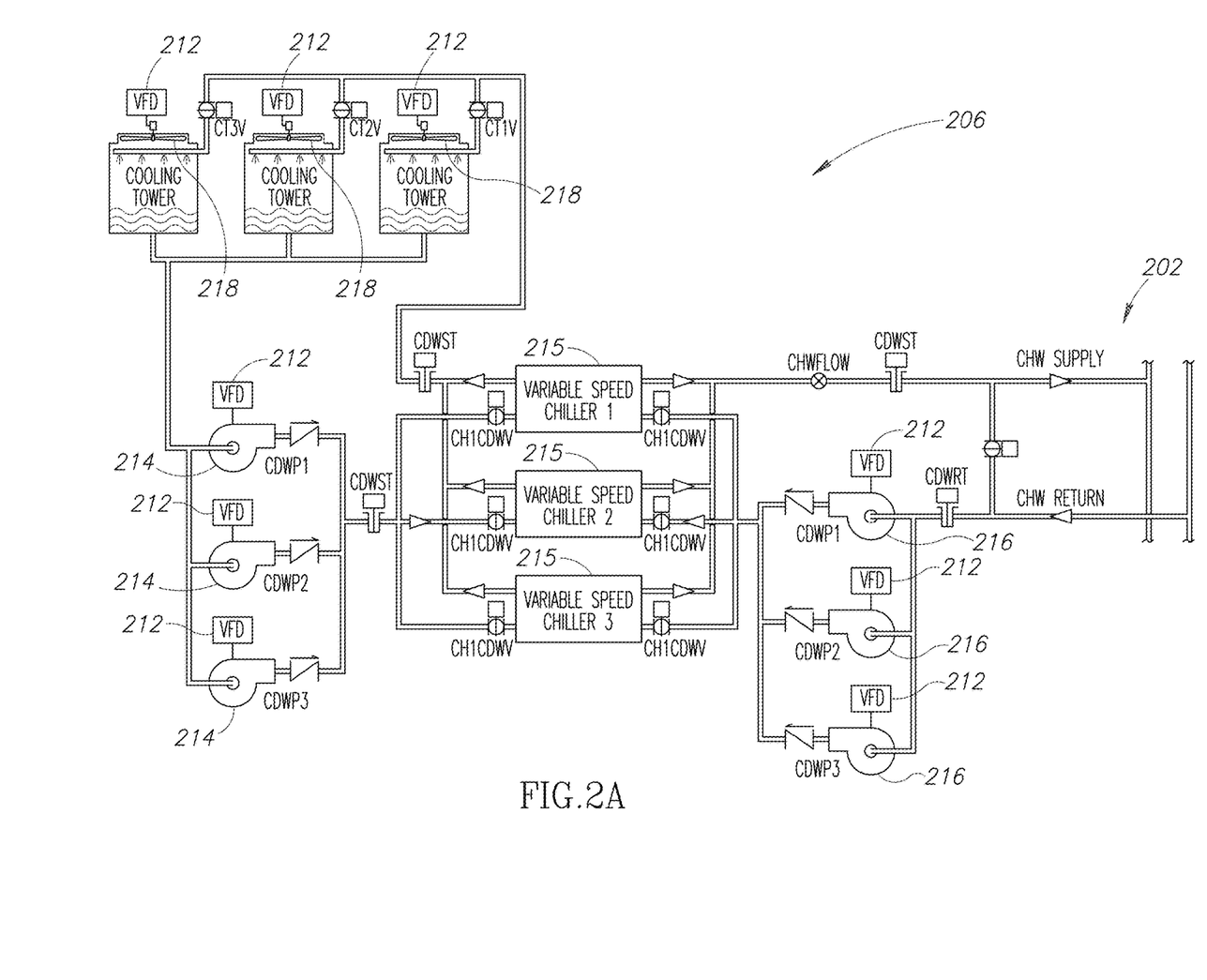
FIG. 2A is a schematic system diagram of a controlled chiller station having at least one variable speed drive coupled to at least one chilled water pump according to an embodiment of the present invention.

FIG. 2A shows a close-up, schematic system diagram of a chiller station 206 in fluid communication with a chilled water loop or conduit 202. The chiller station 206 includes a plurality of variable speed drives 212 coupled to supply pumps 214, coupled to return pumps 216 and coupled to cooling tower fans 218, respectively. Thus, one aspect of the present invention is the monitoring and control of the variable speed drives 212 to quickly respond to real-time building load changes without requiring that the chillers 215 run at either full capacity or zero capacity as happens with conventional, existing systems.

Figure 2B:
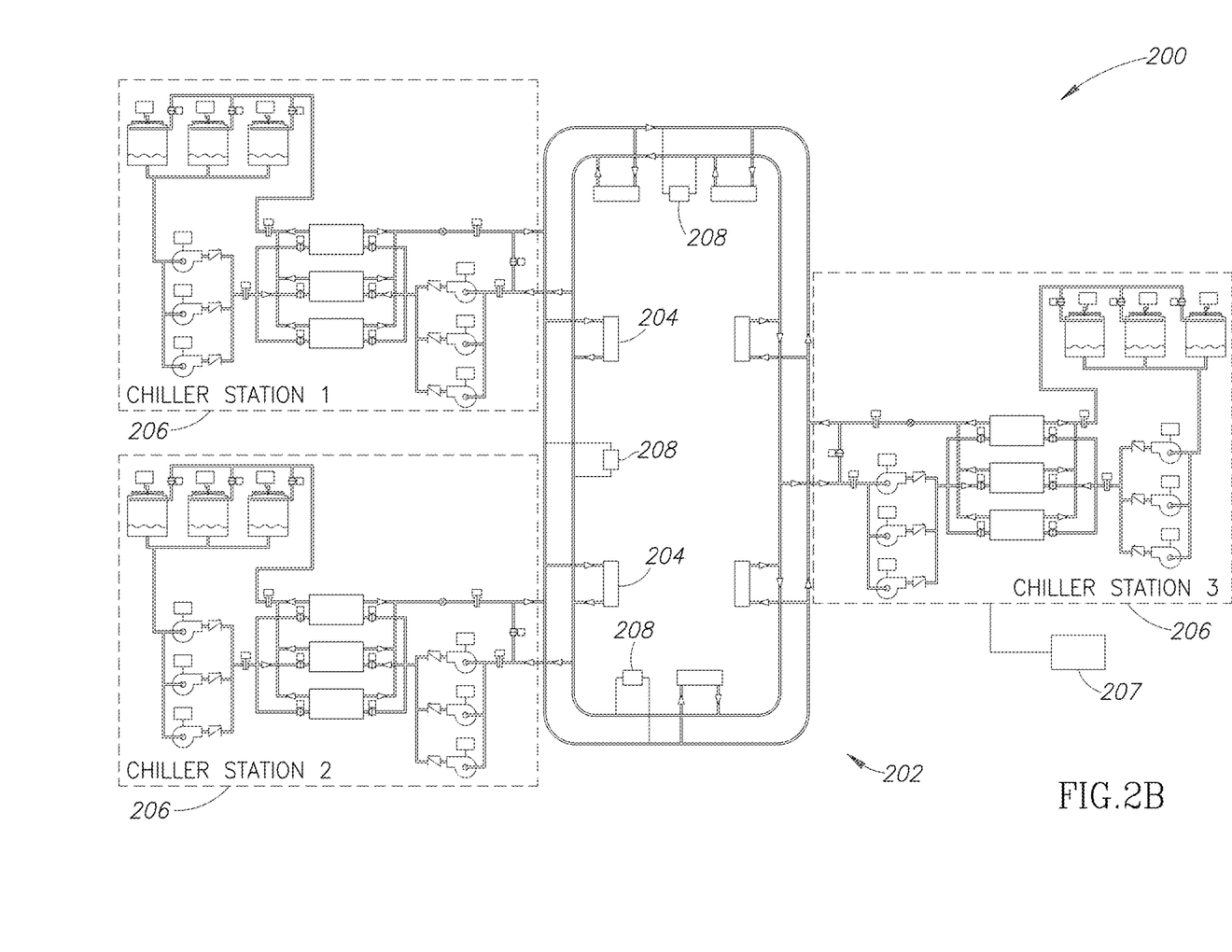
FIG. 2B is a schematic system diagram of another chilled water distribution system according to an embodiment of the present invention.

FIG. 2B shows a schematic system diagram for a chilled water distribution system 200 having a chilled water loop or conduit 202 in fluid communication with a plurality of buildings 204 and also in fluid communication with a plurality of chiller stations 206, which may take the form of the chiller stations 206 described in FIG. 2A. The chilled water loop 202 includes a plurality of pressure sensors 208 for monitoring a differential pressure between a return line and a supply line. In the illustrated embodiment the BASs for the buildings are not shown. In the present embodiment, each chiller station 206 includes one or more variable frequency drives 212 for variably controlling a speed of a supply pump 214, a return pump 216 and/or a cooling tower fan 218. A monitoring and control system (not shown) communicates directly with at least one of the chiller stations 206. For purposes of the present description, the chiller station 206 in communication with the monitoring and control system is the chiller station shown on the right hand side and will be referred to hereinafter as the "controlled" chiller station.

In operation, the differential pressure of the chilled water loop 202 may be monitored at several locations and the speed (i.e., power) of at least one of the supply pumps 214 of the primary chiller station may be continuously monitored. Each of the differential pressure locations will have a minimum required differential pressure for the buildings to function properly (e.g., temperature, humidity, etc.). The speed of the chilled water supply pumps 214 at the primary chilling station will be modulated to maintain the minimum differential pressure at all of these differential pressure locations. In addition, information from the building's chilled water pumps, for instance pump speed taken from the BAS, will allow the monitoring and control system to perform an analysis in real time or at least contemporaneously in time that ensures that any reduction in pressure at one or more of the chilling stations 206 does not adversely affect the operation of the building. By way of example, if the differential pressure at one or more locations became too low then this may cause an overall increase in energy consumption among the buildings 204 in aggregate.

Figure 3:
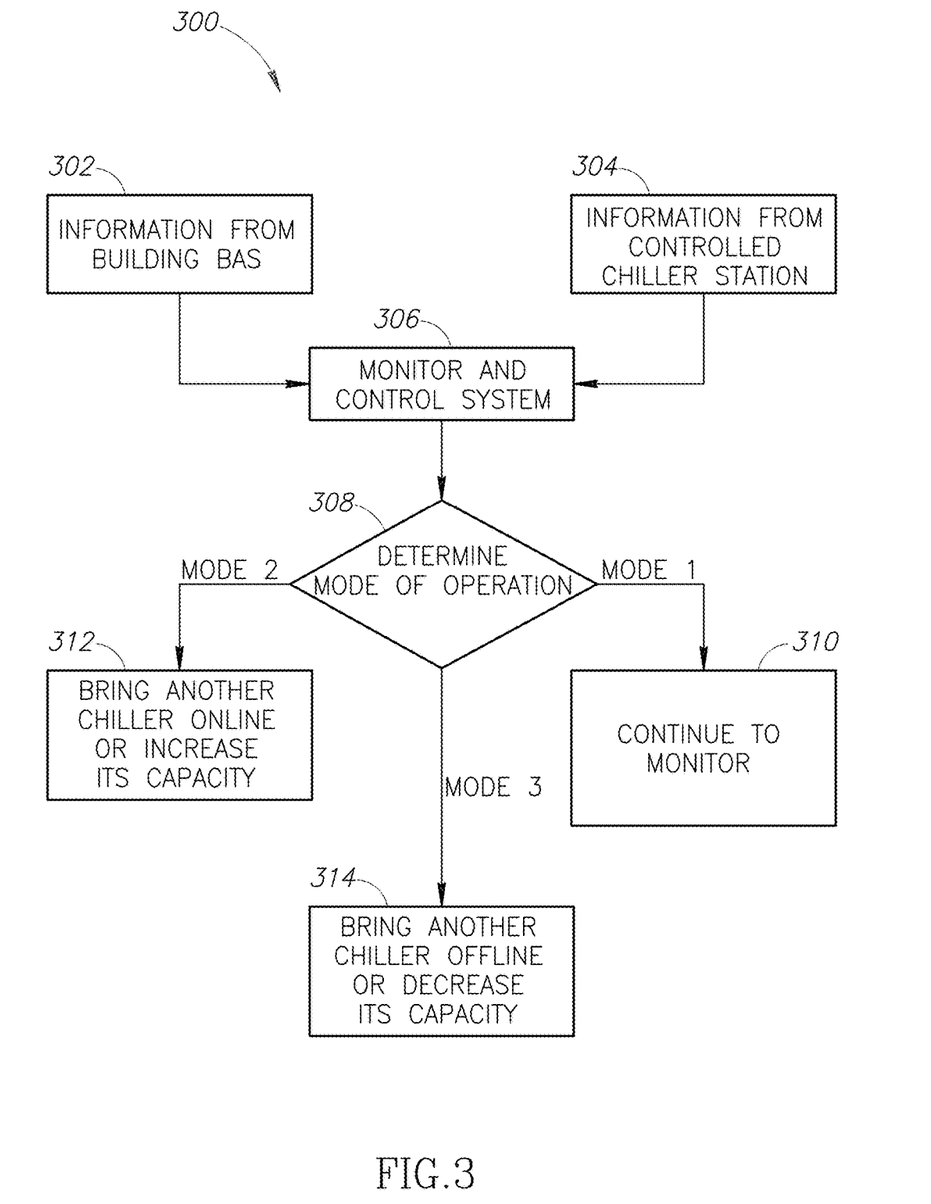
FIG. 3 is a flow diagram of a method for determining a mode of operation for a controlled chiller station according to an embodiment of the present invention.

FIG. 3 shows a flow diagram for a process 300 for controlling the chiller stations based on the differential pressure readings at desired locations throughout the chilled water loop. At 302, information is obtained by the various buildings by the respective BASs. At 304, information about the primary chiller station operation is obtained. At 306, the monitoring and control system analyzes the information 302, 304 to determine a mode of operation as indicated by decision gate 308.

In a first mode of operation (Mode 1), the chiller stations are each online, but none are at capacity. At 310, the monitoring and control system simply continues to monitor the incoming information as indicated by block 310.

In a second mode of operation (Mode 2), one or more of the chiller stations are operating at capacity or may soon be at capacity based on information from the building BASs. At 312, the monitoring and control system determines if one of the chillers at one of the chiller stations should be brought online or if online already then whether its capacity should be increased by signaling the variable speed drive for the respective pump.

In the third mode of operation (Mode 3), one or more of the chiller stations are operating substantially below capacity or may soon be operating at substantially below capacity based on information from the building BASs. At 314, the monitoring and control system determines if one or more chillers at one of the chiller stations should be brought offline and/or which chiller should have its capacity decreased.

The control of one or more variable frequency drives coupled to the chilled water pumps may significantly reduce overall energy consumption for the buildings in aggregate. By way of example, the chilled water distribution system shown in FIG. 2 may be for various buildings on a college campus. In this example, the primary chiller station may be required to meet an average load of approximately 12,000 tons of chilled water and accomplishes this with three chillers online in the primary chiller station. Once the campus load exceeds 12,000 tons then the monitoring and control system determines which chiller or chillers to bring online at one or more of the other chiller stations. Preferably, the monitoring and control system determines when to bring the extra chiller or chillers online on an as-needed basis so as to minimize fluctuations in the chiller stations' steady state operations and thereby reduce overall energy consumption.

Referring back to FIG. 1, the pump speed at chiller station 106*a* controls the differential pressure of the chilled water loop 102 to maintain a desired minimum differential pressure. The pump speed at chiller station 106*c* provides only flow/output control in response to the total output at chiller station 106*a*. The monitoring and control system 107 monitors the pump speeds at chiller stations 106*a* and 106*c*, the chiller flow/output of chillers stations 106*a* and 106*c*, the total flow/output of chiller stations 106*a* and 106*c* and the differential pressure at selected locations throughout the chilled water loop 102. The monitoring and control system 107 then calculates pump speed for the pumps at chiller stations 106*a* and 106*c* and also determines the total number of pumps to be operated at chiller stations 106*a* and 106*c*.

The monitoring and control system 107 may be pre-programmed to store all of the operational set points for flow, output capacity (e.g., tons of chilled water), pump speed, number of pumps in operation for one chiller station, and the desired differential pressure a various locations in the chilled water loop 102. Further, each of these set points may adjustable as building loads change for a variety of reasons.

In one operational embodiment, the chilled water loop pressure may be controlled and a minimum energy level (e.g., Kilowatt per Ton) for the entire system may be achieved by controlling the speed of the pumps at chiller station 106*a* and bringing other chiller stations either online or offline to maintain the minimum differential pressure in the chilled water loop.

Preferably, an operational sequence of the entire system may be determined by the monitoring and control system 107 even when various chillers are different sizes and different evaporator pressure drops are flow controlled using the variable frequency drives on the chilled water pumps instead of the evaporator flow control valves has been routinely done in the past. Thus in FIG. 1, chiller station 106*c* may be referred to as the "flow controlled" chiller station because it is the only chiller station besides chiller station 106*a* to have variable speed drives on its chilled water pumps.

Figure 4:
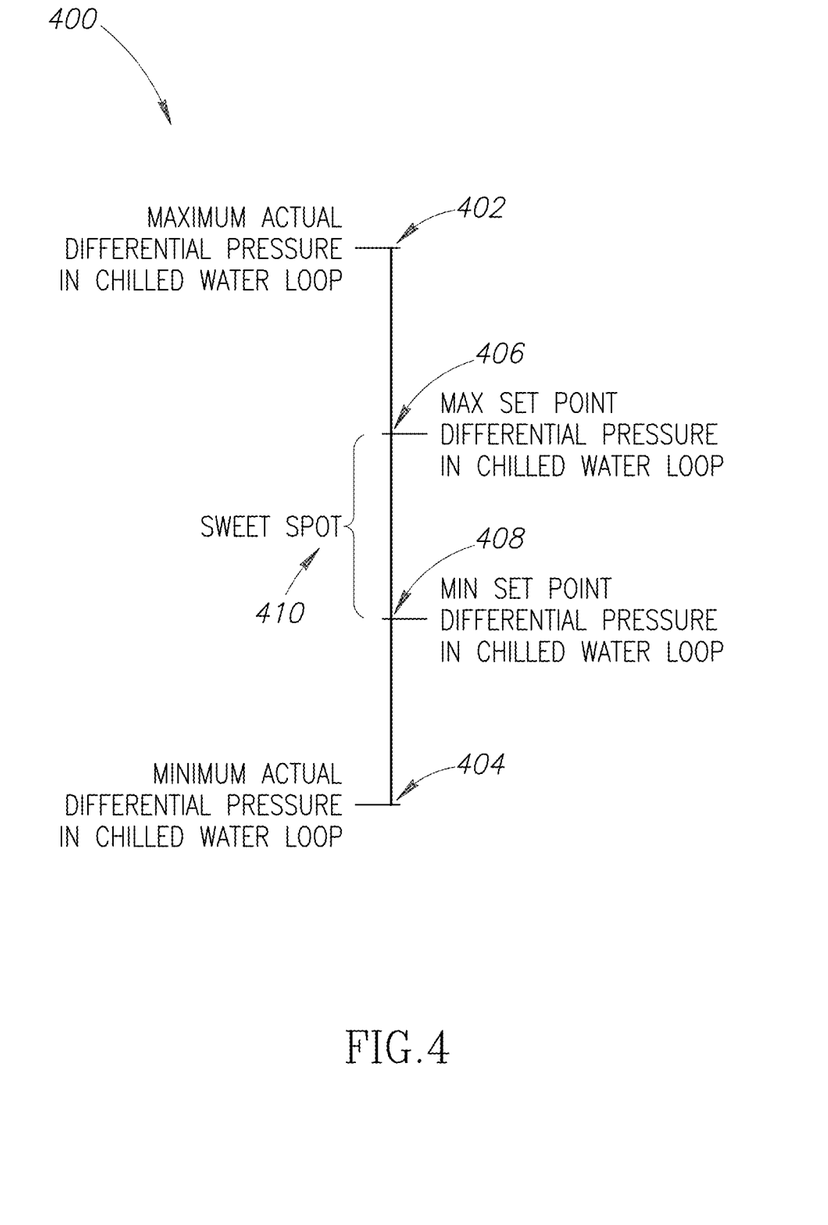
FIG. 4 is a chart for indicating a sweet spot range for operating a controlled chiller station according to an embodiment of the present invention.

In another embodiment, variable frequency drives may be installed on other chilled water pumps in other chilled water stations. In such an embodiment, the monitoring and control system will control the sequence of operation to operate the controlled chiller station in its "sweet spot" (see FIG. 4) in terms of energy efficiency and then bring online one or more individual pumps and chillers of other chiller stations. FIG. 4 is a schematic diagram showing how the baseline or "controlled" chiller station operates over a range of capacities or flow rates. By way of example, the controlled chiller station may operate at a maximum flow rate to generate a maximum differential pressure 402 in the chilled water loop or the controlled chiller station may operate at a minimum flow rate to generate a minimum differential pressure 404 in the chilled water loop. Preferably, the monitoring and controlling system 107 (FIG. 1) functions to control the flow rate of the controlled chiller station to maintain the differential in the chilled water loop between a maximum 406 and minimum 408 set point differential pressure, and thus within a "sweet spot" 410. When above or below the actual maximum or minimum differential pressures, respectively, then the monitoring and control system will determine whether a second individual chiller at one of the other chiller stations should be brought online or offline to move back into the "sweet spot" 410 and still adequately meet the current chilled water load requirements of the buildings.

Now referring back to FIG. 2B, when the chilled water load requirements of the buildings 204 are low enough, chilling station 206 (controlled chiller station) can handle the entire load. Specific differential pressure measurements from around the chilled water loop 202 will be continuously monitored. The monitoring and control system 207 will determine which of the differential pressure locations should be used for control purposes. By way of example, if a minimum set point for one of the buildings 204 (say the upper left building in FIG. 2B) is six pound-force per square inch gauge (psig) and another building (say the lower right building in FIG. 2B) has a minimum set point of two psig, but the actual pressure at the upper left building is six psig and the actual pressure at the lower right building is five psig then the differential pressure for the upper left building would be used for control. Because the minimum set point for the building dictating control is being met by the actual pressure then the monitoring and control system 207 would command the chilled water pump speeds and chilled flow rates at the controlled chiller station 206 to remain constant.

As the building load requirements increase, such as for one or more buildings, then the differential pressure throughout the chilled water loop 202 may decrease and one or more of the measured pressure locations may drop below its required set point. As such, the monitoring and control system 207 will then begin to increase the chilled water pump speeds at the controlled chiller station 206, which will also increase pump flow until the requisite set point differential pressure is again achieved. In one embodiment, the chilled water pump speeds are incrementally increased until the requisite set point differential pressure is achieved.

At a different operational period where the building chilled water loads have decreased, the differential pressure throughout the chilled water loop 202 would correspondingly increase, which may cause one or more of the measured pressure locations to rise above their required set points. In turn, the monitoring and control system 207 will begin to decrease the chilled water pump speeds at the controlled chiller station 206, which also decreases pump flow until the actual differential pressure in the chilled water loop 202 meets the required set point pressure in the same. In one embodiment, the chilled water pump speeds are incrementally decreased until the requisite set point differential pressure is achieved.

The process of the pump speeds at the controlled chiller station 206 being modulated to maintain the chilled water loop differential pressure would continue as long as the output of the controlled chiller station 206 is anticipated to remain within the constraints of its minimum and maximum output and flow. Once the controlled chiller station 206 has reached either a maximum or minimum flow rate then additional action will likely be required, for example bring other pumps and chillers in one of more of the other chiller stations either online or offline.

By way of example, when the controlled chiller station 206 reaches its maximum output, depending on the anticipated building cooling loads for the remainder of the day, one or both of the other chiller stations may need to be brought on line. Conversely, when the controlled chiller station 206 reaches its minimum output the monitoring and control system 107 (FIG. 1) would no longer control the pump speed at the controlled chiller station 206, but instead would maintain the pump speed at its minimum speed while temporarily disregarding the high loop differential pressure. Depending on the anticipated building load requirements for the remainder of the day, the controlled chiller station 206 may need to be taken off line.

For the example where only a single chiller station is online, then as building loads change (e.g., increase or decrease, respectively) the monitoring and control system will modulate pump speed (flow) to generate a corresponding change for maintaining the chilled water loop set point, differential pressure. Since there are multiple differential pressures throughout the loop and multiple minimum set points, the monitoring and control system may also determine which of the differential pressure's is the "controlling differential pressure" at any point in time. In addition to modulating pump speed, the monitoring and control system may also determine the optimum number of chilled water supply pumps that should be in operation at any given time. When a pump is to be added or subtracted the monitoring and control system alerts the operator to either start or stop a pump, and once accepted by the operator, the BOP system will then start or stop the pump just as it currently does. Consequently, the monitoring and control system attempts to maintain the chilled water distribution system in the "sweet spot" where the desired capacity of the building loads is sufficiently met by the controlled chiller station as other chillers within other chiller stations are brought online or offline. Hence, the pump speed, and thus output, of the controlled chiller station is modulated to maintain the desired chilled water loop differential pressure as selected by the monitoring and control system.

In the embodiment where the controlled chiller station is continuously performing pressure control, the monitoring and control system modulates the pump speed of another chiller station brought online to keep the output of the controlled chiller station in the desired "sweet-spot". In this embodiment, the chilled water pumps at the non-controlled chiller station do not react to loop pressure and will maintain a constant flow unless the output of controlled chiller station goes outside of the desired "sweet-spot".

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A distributed process chilled water system comprising:
   a supply line having a plurality of supply line pressure sensors;
   a return line having a plurality of return line pressure sensors, the return line and the supply line forming a chilled water loop, the supply line pressure sensors and the return line pressure sensors configured to provide a plurality of readings of differential pressures throughout the chilled water loop, each differential pressure reading of the plurality being associated with a respective location within the chilled water loop;
   a plurality of chiller stations comprising at least one base chiller station, each chiller station in fluid communication with the return and supply lines, the chiller stations communicatively networked together, each building of a plurality of buildings having a building automation system controller, each building in fluid communication with the return and supply lines, each building having associated therewith a respective pre-determined minimum pressure set point, the controllers communicatively networked together; and an operating system operable to process machine-readable instructions, the operating system in signal communication with at least the base chiller station, the operating system configured to receive signals indicative of the differential pressure readings throughout the chilled water loop and determine, based on the respective pre-determined minimum pressure set points, which of the differential pressures read by the sensors operates as a controlling differential pressure for the chilled water system, the operating system further configured, based on the controlling differential pressure, to determine whether to modulate a pump speed of the base chiller station, bring another chiller online or take another chiller offline to maintain the controlling differential pressure within a desired range.

2. The system of claim 1, wherein the base chiller station includes at least one chilled water pump coupled to a variable frequency drive.

3. The system of claim 1, wherein the operating system modulates the pump speed of the base chiller station by communicating instructions to the variable speed drive.

4. The system of claim 1, wherein the base chiller station includes at least one chiller unit operable to supply and receive water from at least one cooling tower.

5. The system of claim 1, wherein the operating system includes one or more relational control algorithms for determining whether to modulate the pump speed of the base chiller station.

6. The system of claim 1, wherein the operating system determines to bring another chiller online when an actual differential pressure exceeds a maximum set point pressure.

7. The system of claim 1, wherein the operating system determines to take another chiller offline when an actual differential pressure falls below a minimum set point pressure.

8. A method for controlling a chilled water distribution system, the method comprising:

determining a plurality of readings of real-time differential pressures at various locations within a chilled water loop of the distribution system;

monitoring a real-time pump speed of a base chiller station that includes a variable frequency drive coupled to a chilled water pump;

determining an energy load for a plurality of buildings served by the chilled water loop, each building having associated therewith a respective pre-determined minimum pressure set point;

modulating the pump speed of the base chiller station to stay within a desired range of pre-determined set point differential pressures of the chilled water loop; and determining, based on a comparison between the respective pre-determined minimum pressure set points and the differential pressure readings, which of the real-time differential pressures to use as a single controlling differential pressure to decide whether to change the capacity of the distribution system by bringing a chiller either online or offline.

9. The method of claim 8, further comprising calculating a desired pump speed for at least one other chiller station based on the real-time differential pressure, real-time pump speed and energy load for the plurality of buildings.

10. The method of claim 8, wherein modulating the pump speed of the base chiller station coincides with bringing a chiller of another chiller station either online or offline.

11. The method of claim 8, wherein modulating the pump speed of the base chiller station include providing instructions to a variable speed drive coupled to the chilled water pump.

12. The method of claim 8, wherein modulating the pump speed of the base chiller station to stay within the desired range includes maintaining an output capacity of the base chiller station within a desired range, wherein said desired range comprises the range between a minimum set point and a maximum set point of said differential pressures in said chilled water loop.

* * * * *